Oct. 3, 1939.   C. R. SODERBERG   2,174,806

TURBINE APPARATUS

Filed April 30, 1938

WITNESSES:
James K. Mosser
E. H. Lutz

INVENTOR
CARL R. SODERBERG
BY
A. B. Reavi
ATTORNEY

Patented Oct. 3, 1939

2,174,806

UNITED STATES PATENT OFFICE 2,174,806

TURBINE APPARATUS

Carl R. Soderberg, Swarthmore, Pa., assignor to Westinghouse Electric & Manufacturing Company, East Pittsburgh, Pa., a corporation of Pennsylvania Application April 30, 1938, Serial No. 205,217

14 Claims. (Cl. 60—70)

My invention relates to steam turbines equipped with double-acting thrust bearings and it has for an object to provide means giving to the rotor a uni-directional thrust to avoid relative displacement of the casing and rotor to the extent inherent with the thrust bearing.

With a tandem arrangement of high and low-pressure turbines, the low-pressure turbine casing is often anchored to the foundation and connected to the high-pressure turbine casing, and the aggregate, including the high-pressure casing and the portion of the low-pressure casing at the adjacent side of the transverse plane of the anchorage, is mounted so as to move axially to provide for expansion and contraction. A coupling connects the turbine rotors and it provides for relative displacement thereof so that the high-pressure rotor may be displaced axially with the high pressure casing due to expansion and contraction effects, a thrust bearing being associated with the high-pressure end of the high-pressure turbine to maintain a desired relative axial relation of its casing and rotor and serving, with the dummy construction, to oppose steam thrust of the blading. The thrust bearing is usually of the double-acting type to serve as a means for displacing the rotor to provide large packing clearance for starting and smaller or normal clearance when the parts become uniformly heated.

A double-acting thrust bearing introduces capability for relative movement of the casing and rotor, not only on account of the thrust-reversal clearance thereof, but also because of elastic deflections in the members supporting the stationary parts of the thrust bearing. As a consequence, turbines of this type are usually designed so as to produce a thrust component from the active steam surfaces which is always in one direction for all loads and conditions of operation. The direction may be either against the governor or away therefrom, although for many reasons, the former is usually preferred.

In a coupling of the type mentioned, relative axial motions of the two parts are accompanied by large friction forces in the axial direction. The sliding surfaces also carry the torque reactions, so that these friction forces increase with the torque. Experience shows that they vary approximately linearly with the torque. The direction of these friction forces is always opposite to that of the relative motion of the two coupling parts. For example, if during a certain phase of the operation of the turbine, the rotor of the high-pressure element is lengthening in relation to the stationary parts, the two coupling elements will approach each other in the axial direction. The friction forces on the high-pressure rotor are then directed towards the governor end. If, on the other hand, the rotor of the high-pressure element is shortening in relation to the stationary parts, the two coupling elements will separate and the axial friction forces will be directed away from the governor.

In large turbines, the magnitudes of these axial friction forces usually exceed the resultant thrust forces from the active steam parts. Under the circumstances outlined, therefore, the load on the high-pressure turbine thrust bearing may be in one or the other direction, depending upon the conditions of thermal expansion which may happen to prevail. In consequence, the rotor of the high-pressure turbine is caused to shift axially an amount depending upon the clearance of the thrust bearing and upon the elastic deflections of the thrust bearing supports. These displacements may be so large as to render the axial clearance alignment inoperative or unsatisfactory with the result that complications and difficulties are introduced because of the dummy construction and packing, particularly where end-tightened packing is used.

Accordingly, a further object of my invention is to eliminate the aforementioned difficulties by the use of a coupling which will produce an axial thrust component proportional to the torque and still permit free displacements of the two coupling members to accommodate relative expansion.

A further object of my invention is to provide a steam turbine arrangement with means for giving to the turbine rotor a uni-directional thrust to keep the thrust bearing surfaces opposing steam thrust in engagement whenever there is any tendency to separation thereof due to relative expansion and contraction effects of the casing and rotor.

A further object of my invention is to provide first and second aligned machines, having casings and rotors, the first machine being a steam turbine and the casings being anchored so that the turbine casing is free to expand and contract axially toward its high-pressure end, an arrangement for giving a uni-directional thrust to the turbine rotor or spindle comprising a coupling for the adjacent rotor ends having oppositely-inclined helical teeth and a thrust bearing for the rotor of the second machine so that the axial thrust given to the turbine rotor by the coupling is effective, with the turbine thrust bearing, to maintain the predetermined relative axial relation of the turbine casing and rotor irrespective of any tendency to relative displacement thereof in consequence of relative expansion and contraction effects.

These and other objects are effected by my invention as will be apparent from the following description and claims taken in accordance with the accompanying drawing, forming a part of this application, in which:

Figures 1, 2, 3:
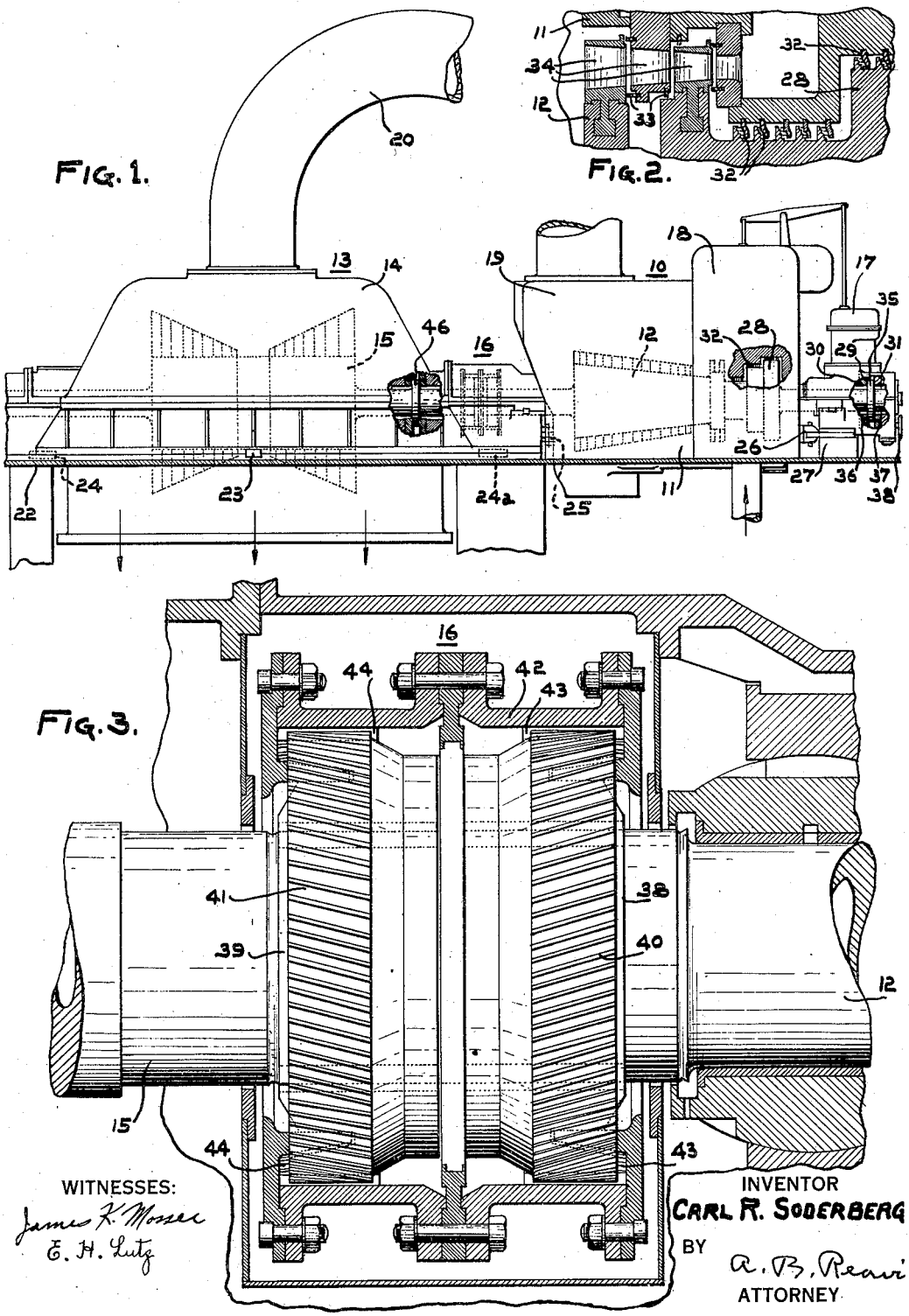
Fig. 1 is an elevational view of a tandem turbine arrangement with parts shown in section and having my improvement applied thereto.
Fig. 2 is an enlarged and sectional detail view of a portion of the high-pressure end of the high-pressure turbine.
Fig. 3 is an enlarged sectional view of the coupling for connecting the turbines.

In the drawing, there is shown a high-pressure turbine, at 10, having a casing 11 and a rotor 12, and a machine, for example, a low-pressure turbine, at 13, having a casing 14 and rotor 15, the rotors being axially aligned and connected by a coupling, at 16. Suitable governing mechanism, at 17, controls the admission of steam to the high-pressure end 18 of the high-pressure turbine and exhaust from the low-pressure end 19 thereof is conducted by the cross-over conduit 20 to the low-pressure turbine.

As is customary, the low-pressure turbine casing is connected to the foundation and the high-pressure turbine casing is connected to the low-pressure casing and mounted so that it is free to expand and contract axially. For example, the casing 14 of the low-pressure turbine is connected to the foundation structure 22 by means of transverse keys 23 arranged in a plane normal to the axis of rotation of the low-pressure turbine and by keys 24 arranged in the vertical plane of said axis, the keys 23 and 24 maintaining the casing in place with respect to these planes while permitting of expansion and contraction thereof axially and transversely. The casing 14 is preferably connected by any suitable means, for example, by a coupling 25 to the high-pressure casing 11, the latter being preferably connected, for example, by means of a coupling 26 to a slidable pedestal 27 and arranged adjacent to the high-pressure end of the high-pressure turbine, the pedestal being provided with bearings, including a double-acting thrust bearing, such as hereinafter described, and carrying the governor, as is customary.

A dummy or balancing piston construction, at 28, is associated with the high-pressure end of the high-pressure turbine to resist steam thrust, the double-acting thrust bearing, at 29, adjacent to the high-pressure end of the high-pressure turbine not only assisting the dummy construction in this connection, the thrust surfaces providing the bearing 30 being effective for this purpose, but preserving the axial relation of the casing and spindle and providing a means, due to cooperation of the thrust surfaces of the right-hand bearing 31, for shifting of the spindle for adjustment of the clearance of the end-tightened packing 32 and 33 associated with the dummy construction and the turbine blading, at 34, respectively, when starting.

As is usual, the double-acting thrust bearing comprises a collar 35 carried by the rotor and having opposed thrust faces engaged by shoes 36 and 37 carried by the casing so as to be axially adjustable relatively thereto to effect clearance adjustment of the packing incident to starting, the casing carrying suitable means, indicated at 38 to effect axial adjustment of the shoes 36 and 37 in a well-known manner.

The rotor or spindle 12 of the high-pressure turbine is connected to the rotor or spindle of the machine, at 13, by means of the coupling, at 16, the coupling being preferably comprised by gear members 38 and 39 carried by adjacent spindle or rotor ends and having peripheral teeth 40 and 41. A muff member 42 encompasses the gear members and has internal teeth 43 and 44 meshing with the teeth 40 and 41 respectively, the internal teeth being longer than the peripheral teeth to permit of axial displacement of the coupling parts sufficient to accommodate axial movement of the turbine rotor resulting from expansion and contraction effects.

As a double-acting thrust bearing necessarily has a small degree of thrust-reversal clearnace, that is, will permit of a few thousandths of an inch, for example, .015 or .020", of relative axial movement of the parts upon thrust reversal, and as elastic deflection of the members supporting the stationary parts of the thrust bearing also permits of relative axial displacement, turbines are usually designed so that the active steam surfaces give a thrust component which is always in one direction for all loads and conditions of operation. The direction of this component may be toward the governor or away therefrom, although for many reasons the former is usually preferred and is illustrated in the drawings.

In a coupling of the type already described, relative axial motions of the parts are accompanied by large friction forces in the axial direction. The sliding tooth surfaces also carry the torque reactions, so that these friction forces increase with torque. These forces act in the direction opposed to relative motion of the coupling parts, that is, if during a certain phase of the operation of the turbine, the rotor of the high-pressure element lengthens in relation to the stationary parts, the gear elements 38 and 39 of the coupling will approach each other in the axial direction, the friction forces on the high-pressure rotor being then directed toward the governor. On the other hand, if the rotor of the high-pressure element shortens in relation to the stationary parts, such coupling elements will separate and the axial friction forces will be directed away from the governor.

With large turbines, the magnitude of these axial friction forces in the coupling may exceed the resultant thrust forces from the active steam parts, with the result that the load on the thrust bearing, at 29 may be in one direction or the other, depending upon the conditions of thermal expansion prevailing. In consequence, the rotor of the high-pressure turbine may be caused to shift axially an amount depending upon the clearance of the thrust bearing and upon elastic deflections of the thrust bearing supports, and those displacements may be so large as to introduce clearance difficulties.

To render friction effects of the coupling, at 16, ineffective for this purpose, the teeth 40 and 41 are inclined helically in opposite directions, and the same is true with respect to the internal teeth 43 and 44, with the result that, due to cooperation of the thrust bearing, at 46, between the rotor and the casing of the machine, at 13, a unidirectional thrust, which is a function of torque, is exerted on the rotor or spindle 12 so as to avoid reversal effects occurring in the thrust bearing, at 29, and otherwise taking place on account of friction in the coupling.

From the foregoing, it will be apparent that I have provided means which render axial frictional forces in the coupling of a steam turbine ineffective to cause load reversal of the thrust bearing and consequent relative axial displacement of the stationary and rotating parts of the turbine, not only because of thrust-reversal clearance of the bearing, but also on account of elastic deflection of stationary turbine parts supporting the thrust bearing, this result being preferably accomplished by having the coupling formed with oppositely-inclined helical teeth so that it gives to the turbine spindle a uni-directional thrust dependent upon torque. As the frictional forces of the coupling, resisting relative axial displacement caused by steam thrust forces incident to expansion and contraction, vary as the torque, it will be apparent that the inclined helical teeth give a uni-directional thrust which varies as the torque to overcome the frictional forces, with the result that such frictional forces are ineffective to secure load reversal of the thrust bearing on account of relative expansion and contraction, the normally-acting thrust bearing, for example, the thrust bearing 30, being maintained loaded under all loads and conditions of operation.

While I have shown my invention in but one form, it will be obvious to those skilled in the art that it is not so limited but is susceptible of various changes and modifications without departing from the spirit thereaof, and I desire, therefore, that only such limitations shall be placed thereupon as are specifically set forth in the appended claims.

What I claim is:

1. In an axial-flow turbine, a rotor, a casing, a thrust bearing between the casing and rotor, and means for imposing on the rotor a uni-directional thrust to avoid relative displacement of the casing and rotor to the extent inherent with the thrust bearing.

2. In an axial-flow turbine, a rotor, a casing, a double-acting thrust bearing between the casing and rotor and having thrust surfaces effective in opposed axial directions, and means responsive to turbine torque for imposing on the rotor a uni-directional thrust to avoid relative displacement of the casing and rotor to the extent inherent with the thrust bearing.

3. In combination, first and second machines, the first machine having a casing and a rotor subject to relative expansion and contraction and the second machine having a rotor aligned with the rotor of the first machine, a coupling for connecting the rotors and including relatively displaceable parts providing for relative displacement of the rotors, a thrust bearing between the casing and the rotor of the first machine, said first machine including means operative normally to load the thrust bearing in one direction, and means for exerting axial thrust on the rotor of the first machine to avoid relative axial displacement of the casing and rotor of the first machine in consequence of frictional forces of the coupling and relative axial displacement inherently possible with the thrust bearing.

4. In combination, first and second machines, the first machine comprising a steam turbine having a casing and a rotor subject to relative expansion and contraction and the second machine having a rotor aligned with the rotor of the first machine, a coupling for connecting the rotors and including relatively displaceable parts providing for relative displacement of the rotors, a thrust bearing between the turbine casing and the rotor, said turbine including means for exerting thrust on its rotor so that the thrust bearing is normally loaded in one direction, and means including inclined teeth forming power-transmitting elements of the coupling for exerting axial thrust on the turbine rotor to avoid relative axial displacement of the turbine rotor and casing in consequence of frictional forces of the coupling and relative axial displacement inherently possible with the thrust bearing.

5. In combination, first and second machines, the first machine comprising a steam turbine including a casing and a rotor and the second machine including a rotor aligned with the turbine rotor, a coupling for connecting the rotors and including gear members having peripheral teeth and a muff member having internal teeth meshing with the peripheral teeth, a thrust bearing between the turbine casing and rotor, said turbine including means for exerting steam thrust on the rotor such that the thrust bearing is normally loaded in one direction, and means responsive to torque of the turbine rotor and including teeth of said coupling which are oppositely inclined for exerting axial thrust on the turbine rotor to avoid relative axial displacement of the turbine rotor and casing in consequence of coupling frictional forces and relative axial displacement inherently possible with the thrust bearing.

6. In combination, first and second machines, the first machine comprising an axial flow turbine and each machine including a casing and a rotor, a coupling for connecting the rotors and including parts having power-transmitting abutment elements affording relative displacement thereof to provide for relative displacement of the rotors, a double-acting thrust bearing between the turbine casing and rotor and having thrust surfaces effective in opposed axial directions, said turbine incuding means for exerting steam thrust on its rotor such that said thrust bearing is normally loaded in one direction, and means including abutment elements of said coupling parts which are inclined for exerting on the turbine rotor a thrust to avoid relative displacement of the turbine casing and rotor in consequence of coupling frictional forces and relative axial displacement inherently possible with the thrust bearing.

7. In combination, first and second machines, the first machine being an axial flow turbine and each machine including a casing and a rotor; means for mounting the casing so that the turbine casing may move axially to accommodate expansion and contraction: a coupling for connecting the rotors and including gear members having peripheral teeth and a muff member encompassing the gear members and having internal teeth engaging the peripheral teeth; a double-acting thrust bearing between the turbine casing and rotor and having thrust surfaces effective in opposed axial directions; said turbine including means for exerting steam thrust on its rotor such that said thrust bearing is normally loaded in one direction; and means including teeth of said coupling gear and muff members which are oppositely inclined for exerting on the turbine rotor a thrust to avoid relative axial displacement of the turbine casing and rotor in consequence of coupling frictional forces and relative axial displacement inherently possible with the thrust bearing.

8. In combination, first and second machines, the first machine being a steam turbine and both machines having axially-connected casings and axially-aligned rotors, means for anchoring the casing of the second machine and for mounting the turbine casing so that the latter is free to move axially incident to expansion and contraction, a coupling for connecting the rotors and including parts having power-transmitting abutment elements affording relative displacement thereof to provide for relative displacement of the rotors, a thrust bearing between the turbine casing and rotor, means including blading and a dummy piston construction for exerting steam thrust on the turbine rotor such that said thrust bearing is normally loaded in one direction, end-tightened packing for the blading and the dummy construction, and means including abutment elements of said coupling parts which are inclined for exerting on the turbine rotor an axial thrust to avoid relative axial displacement of the turbine casing and rotor in consequence of coupling frictional forces and relative axial displacement inherently possible with the thrust bearing.

9. In combination, first and second machines, the first machine being an axial flow turbine and each machine including a casing and a rotor, means for mounting the casings so that the turbine casing may move axially incident to expansion and contraction, end-tightened packing for internal elements of the turbine, a coupling for connecting the rotors and including gear members having peripheral teeth and a muff member having internal teeth meshing with the peripheral teeth, a double-acting thrust bearing between the turbine casing and rotor and having thrust surfaces effective in opposed axial directions, means for displacing the thrust bearing relatively to the turbine casing to vary the sealing clearance of the end-tightened packing, said turbine including means for exerting steam thrust on its rotor such that said thrust bearing is normally loaded in the direction for defining sealing clearance of the packing, and means responsive to torque of the turbine rotor and including said coupling gear and muff member teeth which are inclined in opposite directions for exerting axial thrust on the turbine rotor to avoid relative axial displacement of the turbine rotor and casing in consequence of coupling frictional forces and relative axial displacement inherently possible with the thrust bearing.

10. The combination with first and second machines, the first machine being a steam turbine and both machines having casings and axially aligned rotors; the casings being anchored so that the turbine casing is free to move axially incident to expansion and contraction; the turbine including a dummy piston arrangement, end-tightened packing, and a thrust bearing between its casing and rotor at the high-pressure end: of means for maintaining a predetermined relative axial relation of the turbine casing and its rotor comprising a thrust bearing between the casing and the rotor of the second machine and a coupling between the rotors of the first and second machines; said coupling comprising gear members connected to the adjacent rotor ends and having oppositely-inclined helical teeth and a muff member encompassing the gear members and having internal teeth meshing with the helical teeth.

11. The combination with the first and second machines, the first machine being a steam turbine and both machines having casings and axially-aligned rotors; the casings being anchored so that the turbine casing is free to move axially incident to expansion and contraction; the turbine including a dummy piston arrangement, end-tightened packing, and a thrust bearing between its casing and rotor at the high-pressure end; of means for maintaining a predetermined relative axial relation of the turbine casing and its rotor comprising a thrust bearing between the casing and the rotor of the second machine and a coupling between the rotors of the first and second machines; said coupling comprising gear members connected to the adjacent ends of the rotors and having oppositely-inclined helical teeth and a muff member encompassing the gear members and having internal teeth meshing with the teeth of the gear members, at least the internal teeth of the muff member meshing with the turbine rotor gear member being longer than the teeth of the latter.

12. The combination with high and low-pressure turbines having casings and axially aligned rotors, the low-pressure casing being anchored to the foundation and the high-pressure casing being connected thereto and movable axially to accommodate axial expansion and contraction of the casing aggregate comprising the high-pressure casing and the portion of the low-pressure casing on the adjacent side of the transverse plane of the anchorage and the high-pressure turbine including a dummy construction and a thrust bearing adjacent to its high pressure end and end-tightened packing: of means for maintaining a predetermined axial relation of the high-pressure turbine casing and its rotor comprising a thrust bearing between the low-pressure turbine casing and its rotor and a coupling for the adjacent ends of the rotors and providing axial thrust due to application of torque thereto by the high-pressure turbine and which is effective, with the high-pressure turbine thrust bearing, to maintain a predetermined relative axial relation of the high-pressure turbine casing and rotor irrespective of relative axial expansion and contraction thereof.

13. The combination with high and low-pressure turbines having casings and axially aligned rotors, the low-pressure casing being anchored to the foundation and the high-pressure casing being connected thereto and movable axially to accommodate axial expansion and contraction of the casing aggregate comprising the high-pressure casing and the portion of the low-pressure casing on the adjacent side of the transverse plane of the anchorage and the high-pressure turbine including a dummy construction and a thrust bearing adjacent to its high-pressure end and end-tightened packing; of means for maintaining a predetermined axial relation of the high-pressure turbine casing and its rotor comprising a thrust bearing between the low-pressure turbine casing and its rotor and a coupling for connecting adjacent ends of the turbine rotors; said coupling comprising gear members connected to the rotor ends and having peripheral and oppositely-inclined helical teeth and a muff member encompassing the gear members and having internal teeth meshing with the teeth thereof.

14. The combination with high and low-pressure turbines having casings and axially aligned rotors, the low-pressure casing being anchored to the foundation and the high-pressure casing being connected thereto and movable axially to accommodate axial expansion and contraction of the casing aggregate comprising the high-pressure casing and the portion of the low-pressure casing on the adjacent side of the transverse plane of the anchorage, and the high-pressure turbine including a dummy construction, end-tightened packing, and a thrust bearing having engaging thrust surfaces arranged to resist steam thrust thereof: of means for maintaining a predetermined axial relation of the high-pressure turbine casing and its rotor comprising a thrust bearing between the low-pressure casing and its rotor and a coupling connecting the adjacent ends of the turbine rotors; said coupling comprising gear members connected to the adjacent rotor ends and having peripheral and oppositely inclined helical teeth and a muff member encompassing the gear members and having internal teeth meshing with the peripheral teeth; the directions of inclination of said teeth being such that, for the direction of rotation of the high-pressure turbine, a thrust is developed thereby and which is effective to keep the thrust surfaces of the high-pressure turbine thrust bearing engaged.

CARL R. SODERBERG.